United States Patent [19]

Hashimoto et al.

[11] Patent Number: 4,622,604
[45] Date of Patent: Nov. 11, 1986

[54] MAGNETIC HEAD CONTROLLING APPARATUS

[75] Inventors: Yasuichi Hashimoto; Tomihisa Ogawa, both of Tokyo, Japan

[73] Assignee: Kabushiki Kaisha Toshiba, Kawasaki, Japan

[21] Appl. No.: 611,758

[22] Filed: May 18, 1984

[30] Foreign Application Priority Data

May 23, 1983 [JP] Japan ................................. 58-90285

[51] Int. Cl.[4] .............................................. G11B 5/55
[52] U.S. Cl. ..................................................... 360/78
[58] Field of Search ......................................... 360/78

[56] References Cited

U.S. PATENT DOCUMENTS 4,031,443  6/1977  Droux et al. ......................... 318/561
4,096,579  6/1978  Black et al. .......................... 364/900
4,272,793  6/1981  Van Landingham .................. 360/78

*Primary Examiner*—George G. Stellar
*Attorney, Agent, or Firm*—Cushman, Darby & Cushman

[57] ABSTRACT

A controlling apparatus for achieving velocity control in the course of a seeking operation of the magnetic head includes an intended address register for storing intended track addresses. A microprocessor calculates the intended moving distance of the head on the basis of an intended track address applied from the intended address register and track pulses applied from a track detector circuit every time the head crosses a track on the magnetic disk. On the other hand, previously stored in a memory are plural kinds of velocity tables consisting of plural kinds of intended velocity data which correspond to the intended moving distance of the head. The microprocessor reads and sets from the memory appropriate intended velocity data which corresponds to the intended and calculated moving distance of the head. The head is moved by a carriage and performs its seeking operation at an appropriate velocity on the basis of the intended velocity data set by the microprocessor.

1 Claim, 6 Drawing Figures

MAGNETIC HEAD CONTROLLING APPARATUS

BACKGROUND OF THE INVENTION

The present invention relates to a magnetic head controlling apparatus employed in the magnetic disk apparatus to control the seeking operation of the magnetic head.

With the magnetic disk apparatus, it is after the position determining operation of the magnetic head (which will hereafter be referred to as the head) is carried out relative to a magnetic disk platter (which will hereafter be referred to as the disk) that the reading and writing operations are conducted relative to data at a certain position on the disk. The position determining operation is usually called the seeking operation. Generally speaking, the manner of controlling the seeking operation includes speed control at the time when the head is moved to an intended track on the disk and position control at the time when the head is positioned accurately on the intended track. In addition to these speed and position controls, there is also included transient control at the time when the speed control is shifted to the position control.

Upon controlling speed in the course of the seeking operation control, the distance which the head is to move to an intended track on the disk is calculated by a moving distance calculator circuit 10 shown in FIG. 1. An address TA, which represents the intended track, is instructed by a controller of the magnetic disk apparatus and the calculator circuit 10 calculates the moving distance of the head on the basis of this address TA. The present position of the head on the disk is stored in the apparatus. Based on a position signal A provided by a position detector circuit (not shown), the track detector circuit 11 generates a track pulse TP when the head passes a track on the disk. The position detector circuit provides the position signal, which represents the position of the head, on the basis of servo-data previous-ly, recorded on the disk. A velocity detector circuit 12 detects the moving velocity Vd of the head on the basis of the position signal A.

Both of the track pulses TP applied from the track detector circuit 11 and the moving distance data (or number TN of tracks crossed) of the head applied from the moving distance calculator circuit 10 are supplied to a velocity data calculator circuit 13, which calculates an intended velocity data (or number of tracks) V1 of the head on the basis of the track pulses TP and number of crossed tracks TN generated when the head actually moves. A velocity signal generator circuit 14 is provided with a table where the velocity signal, which corresponds to the intended velocity data V1 applied from the velocity data calculator circuit 13, is previously stored as a digital data. The velocity signal generator circuit 14 converts the digital data selected from the table to an analog signal, using a D/A converter, and generates an intended velocity signal V2.

A subtracter circuit (which usually consists of operational amplifiers) supplies to a carriage an output signal D, which is equal to the difference between the intended velocity signal V2 applied from the velocity signal generator circuit 14 and the detected velocity signal Vd applied from the velocity detector circuit 12 and corresponding to the moving velocity of the head, whereby the carriage is driven to make the detected velocity signal Vd equal to the intended velocity signal V2. Namely, the head is moved to the intended track on the disk at a predetermined speed thanks to the drive of the carriage.

The velocity data calculator circuit 13 operates in such a way that the number of crossed tracks (or data corresponding to the intended moving distance) TN is reduced in response to the track pulse TP, generated every time the head crosses a track on the disk. The intended velocity signal V2 is produced in the velocity signal generator circuit 14 on the basis of the intended velocity data (or number of tracks) V1 applied from the velocity data calculator circuit 13. This intended velocity signal V2 is obtained from an equation where velocity is usually proportional to the square root of distance. It is assumed here that the intended velocity signal V2 changes, as shown by a curve 20 in FIG. 2A, for example, as the head moves on the disk. Now, providing the head starts moving from a point D and stops at a point A in FIG. 2A, the difference in this case between the intended velocity (or curve 20) and the actual moving velocity (or curve 21) of the head is substantially high, i.e., starting from point D and coming to point E. Therefore, output of the subtracter circuit 15 shown in FIG. 1 is large enough to supply a large drive current to the carriage. Namely, acceleration current I+, represented by numeral 23 in FIG. 2B, for example, is supplied to the carriage. The velocity of the head is thus increased like the curve 21 in FIG. 2A, and when the head reaches its intended velocity at point E, it moves at a certain velocity without being accelerated and decelerated.

When the head comes near the stop position (or intended track) A, the intended velocity is reduced to achieve the decelerating operation. The deceleration current (or acceleration current I+ and reversed polarity) I−, represented by numeral 24 in FIG. 2B, for example, is supplied to the carriage this time. In the case of a short seeking operation where the head moves from point B to point A in FIG. 2A, a certain velocity section vanishes and drive currents, represented by numerals 25 and 26 in FIG. 2C, for example, are supplied to the carriage.

The drive current supplied to the carriage is changed corresponding to the moving distance of the head, as described above, to control the velocity of the head. However, the drive current supplied to the carriage becomes that which is represented by broken lines in FIGS. 2B and 2C due to the properties of the carriage and its drive circuit. This causes the changeover of the head from acceleration to deceleration to be delayed, thereby erroneously making the moving velocity of the head different its than intended velocity. If the seeking operation of the head is carried out over a relatively long distance in this case, the error will become smaller as time lapses. Until the head reaches point A (or the intended track), therefore, the moving velocity of the head can substantially follow the intended velocity thereof.

When the seeking operation of the head is short (or when the head moves from point B to point A in FIG. 2A, for example), however, the delay of deceleration influences the moving velocity of the head until the head comes just before point A. In the case of a short seeking operation, therefore, it happens sometimes that the velocity of the head unnecessarily increases when velocity control is changed over to position control (or transient control) just before the intended track (or point A). A seeking mistake is thus caused in the worst case, thereby lowering the accuracy for determining the position of the head at the time when the head is being positioned on the intended track.

In order to solve this problem, it is imagined that the intended velocity (or curve 20 in FIG. 2A) is previously set low, but the moving time of the head during the seeking operation is increased in this case. Namely, the average value of seeking time increases to conventionally carry out the short seeking operation (in which the moving distance of the head is small) with high accuracy. As a result, it is difficult to realize a high velocity operation of the magnetic disk apparatus.

SUMMARY OF THE INVENTION

The object of the present invention is to provide a magnetic head controlling apparatus capable of shortening the seeking time, even in the case of a short seeking operation, in the course of controlling the seeking operation of the head, and reliably controlling the seeking operation at high velocity.

In the case of a controlling apparatus for achieving velocity control in the seeking operation of the head according to the present invention, an intended address memory means is arranged to store intended track addresses on the disk which represent intended moving positions of the head. A moving distance calculator means calculates an intended moving distance of the head on the basis of an intended track address, applied from the intended address memory, and track pulses, applied from a track detector means in response to the movement of the head. An intended velocity data setting means reads out appropriate intended velocity data from a table previously arranged in the intended velocity memory means, and then sets the data; said data corresponding to the moving distance calculated by the moving distance calculator means.

A magnetic head moving means moves the head at an appropriate velocity on the basis of the intended velocity data set by the intended velocity data setting means.

When the apparatus has such an arrangement as described above, an appropriate intended velocity can be set corresponding to the moving distance of the head. Even in the case of a seeking operation for a short distance, therefore, the seeking time can be shortened to realize reliable control over the seeking operation performed at a high velocity. As a result, the operation of reading and writing data in the magnetic disk apparatus can be achieved at high velocity and with high accuracy.

DETAILED DESCRIPTION OF THE PREFERRED EMBODIMENT

Figure 3:
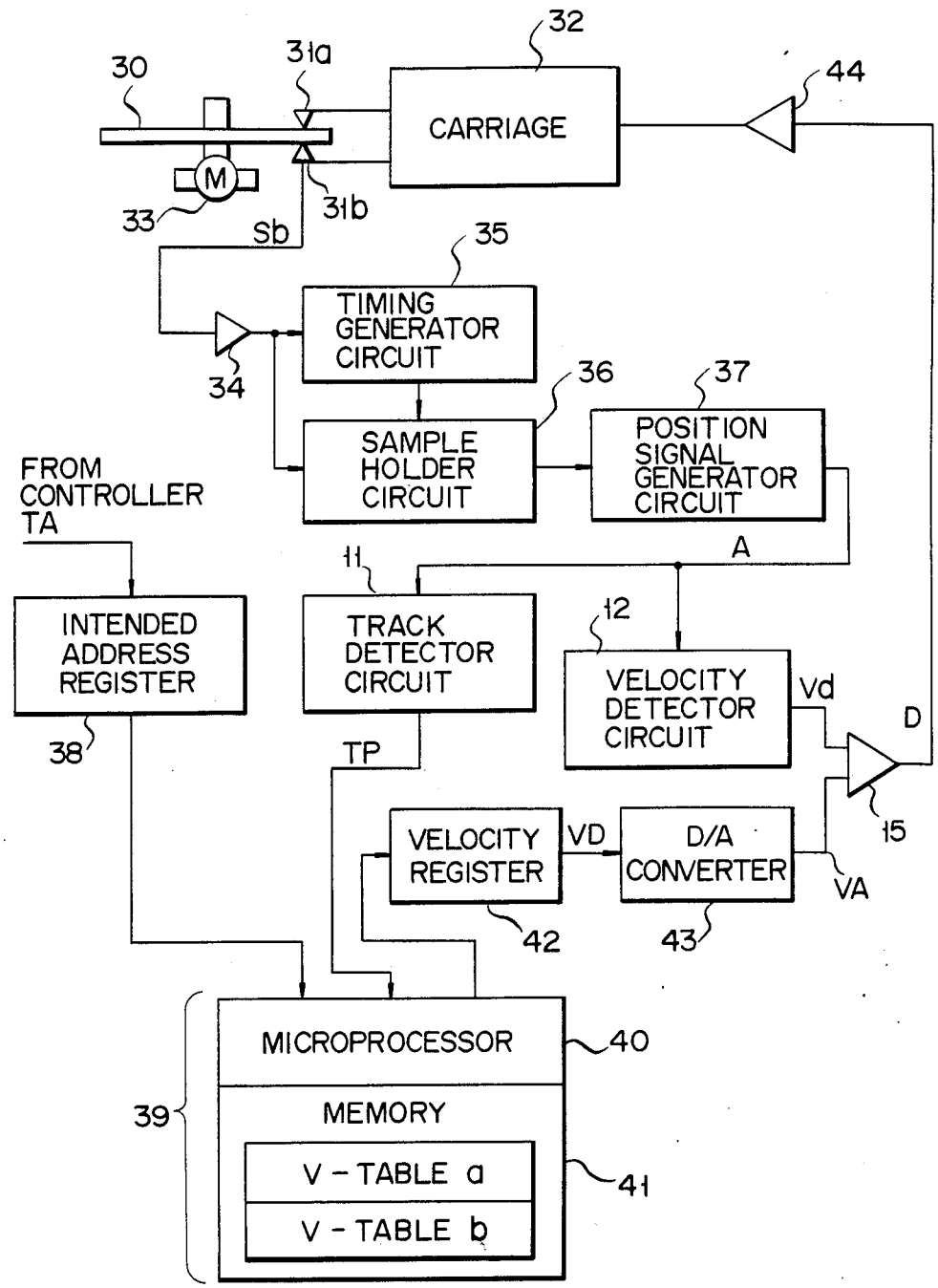
FIG. 3 is a block diagram showing the arrangement of an example of the magnetic head controlling apparatus according to the, present invention.

FIG. 3 is a block diagram showing the arrangement of an example of the magnetic head controlling apparatus according to the present invention. A magnetic head includes two kinds of heads, a data head 31a (which will hereafter be referred to as the head) and a servo-head 31b, arranged relative to a disk 30. Date head 31a is intended to read/write user data from/to disk 30, while the servo-head 31b reads servo-data previously recorded on a servo-surface of the disk 30. Each of the heads 31a and 31b is attached to a carriage 32 and moved on the disk 30 at a predetermined velocity when the carriage 32 is driven.

The disk 30 is now rotated by a motor 33 and the head 31a starts its seeking operation to move to an intended track on the disk 30. Servo-data recorded on the disk 30 is read by the servo-head 31b and reproduced to an electrical signal (or servo-signal) Sb, which is amplified by an amplifier 34 and then applied to a timing generator circuit 35 and a sample holder circuit 36. The servo-signal is held, as position information, in the sample holder circuit 35, responsive to a timing signal generated by the timing generator circuit 35. A position signal, representing the position of the head 31a relative to a track on the disk 30, is produced in a position signal generator circuit 37 on the basis of the position information held in the sample holder circuit 36.

A track detector circuit 11 detects the level of the position signal A produced by the position signal generator circuit 37 and generates a track pulse TP every time the head 31a crosses above a track on the disk 30. On the other hand, a velocity detector circuit 12 detects any change of the position signal and also detects a moving velocity of the head 31a at the time when the head 31a moves on the disk 30. Upon starting the seeking operation of the head 31a, an intended track address TA which represents the intended moving position of the head 31a is set by a controller (which is a means for controlling the operation of the magnetic disk apparatus and which is not shown). This intended track address TA is stored in an intended address register 38. A data process means 39 comprises a microprocessor (CPU) 40 and a memory 41, and operates to set an appropriate intended velocity of the head 31a in the course of its seeking operation. Namely, the CPU 40 operates according to a previously prepared program to calculate the intended moving distance of the head 31a on the basis of the intended track address TA, applied from the intended address register 38, and the track pulses, TP applied from the track detector circuit 11. The memory 41 previously stores plural kinds of velocity tables (or V-tables) a and b which consist of plural kinds of intended velocity data corresponding to the intended moving distance of the head 31a.

A velocity register 42 memorizes an appropriate intended velocity data selected from the memory 41 by the CPU 40 responsive to the intended moving distance of the head 31a calculated by the CPU 40. An intended velocity data VD applied from the velocity register 42 is converted by a digital/analog converter (or D/A converter) 43 to an intended velocity signal VA which is an analog signal. The velocity signal VA applied from the D/A converter 43 is supplied to one of the input terminals of a subtracter circuit 15, while the velocity signal Vd applied from the velocity detector circuit 12 is supplied to other input terminals of the subtracter circuit 15, so that the subtracter circuit 15 generates an output signal D which corresponds to the difference between the intended velocity signal VA and the velocity signal Vd. The output signal D of the subtracter circuit 15 is amplified by a driving amplifier 44 and then supplied as a drive signal to the carriage 32.

The head 31a is moved at first to a reference track (or track 0, for example) at the time when the apparatus is started. An intended track address TA on the disk 30 whose data is read and written by the head 31a is then set by the controller. The intended track address TA is stored in the intended address register 38 by means of the controller. When the head starts its moving, track pulses TP are generated from the track detector circuit 11 every time the head 31a crosses above a track on the disk 30. When the CPU 40 receives the track pulses TP from the track detector circuit 11, it counts the track pulses TP and as a result detects the present position (or track address) of the head 31a, which has moved on the disk 30. The moving velocity of the head 31a is detected by the velocity detector circuit 12.

When the CPU 40 obtains the present track address (which will hereafter be referred to as the present track address TC) of the head 31a, by counting the track pulses TP as described above, it calculates an intended moving distance (or number of tracks TN) of the head 31a on the basis of the present track address TC and the intended track address TA stored in the intended address register 38. More specifically, when the CPU 40 reads out the intended track address TA from the intended address register 38, it finds the difference between the intended track address TA and the present track address TC and calculates the number of tracks TN from the difference; said number of tracks representing the distance which the head 31a will be moved. It thus calculates the number of tracks TN which the head crosses to reach the intended track in response to the track pulses TP applied from the track detector circuit 11. Further, it reads out of the memory 41 appropriate intended velocity data which corresponds to the calculated moving number of tracks TN (or the distance which the head 31a is to move).

Figure 1:
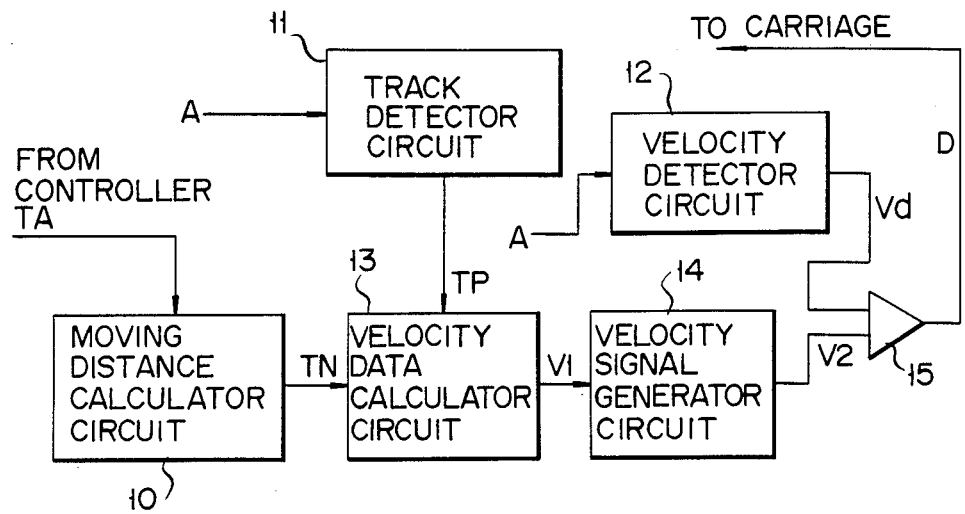
FIG. 1 is a block diagram showing a partial arrangement of the conventional magnetic head controlling apparatus.
Figure 2A:
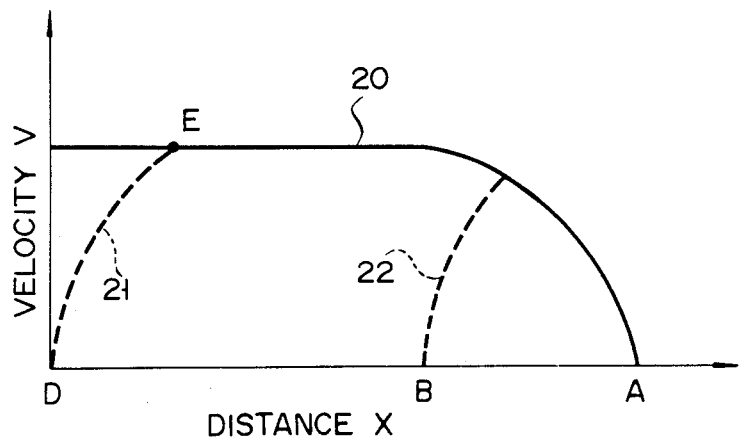
FIG. 2A shows a velocity curve and an intended velocity curve of the head to explain the operation of the apparatus shown in FIG. 1.
Figure 2B:
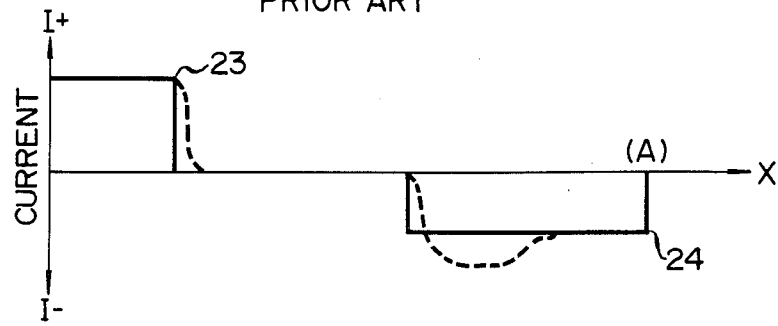
FIGS. 2B and 2C are waveforms of a drive current supplied to the carriage and intended to explain the operation of the apparatus shown in FIG. 1.
Figure 2C:
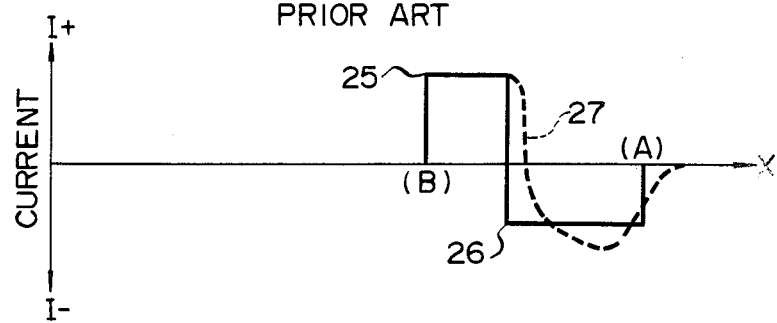
Figure 4:
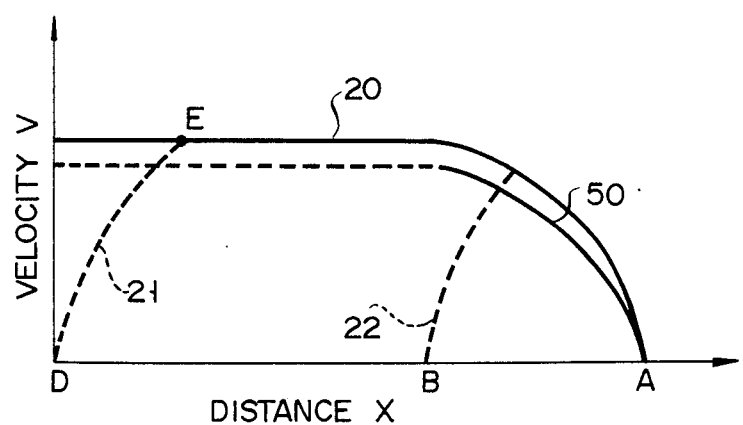
FIG. 4 shows a velocity curve and an intended velocity curve to explain the operation of the apparatus shown in FIG. 3.

The memory 41 previously stores the V-tables a and b consisting of appropriate intended velocity data which corresponds to the intended moving distance of the head 31a. The V-tables a and b consist of intended plural velocity data which correspond to intended velocity curves 20 and 50, respectively, as shown in FIG. 4. Providing that the CPU 40 judges that the distance which the head 31a is to move corresponds to the distance starting from point D and ending at point A in FIG. 4, it reads out of the V-table a in the memory 41 intended velocity data corresponding to the curve 20 in FIG. 4, and stores it in the velocity register 42. On the other hand, providing that it calculates that the distance which the head 31a is to move corresponds to the relatively short distance starting from point B and ending at point A in FIG. 4, it reads out of V-table b in the memory 41 intended velocity data corresponding to the curve 50 in FIG. 4, and stores it in the velocity register 42.

The intended velocity data VD stored in the velocity register 42 is converted by the D/A converter 43 to an intended velocity signal VA, which is an analog signal (or voltage signal, usually), and supplied to one of the input terminals of the subtracter circuit 15. Supplied to the other input terminals of the subtracter circuit 15 from the velocity detector circuit 12 is the velocity signal Vd which represents the actual velocity at which the head moves. The subtracter circuit 15 produces an output signal (or voltage signal) which corresponds to the difference between the intended velocity signal VA and the velocity signal Vd. This output signal D is amplified by the drive amplifier 44 and supplied to the carriage 32, which is driven at a velocity corresponding to the output signal D applied from the subtracter circuit 15. Namely, the carriage 32 is driven by the operation of the subtracter circuit 15 in such a way that the velocity signal Vd becomes equal to the intended velocity signal VA. When the carriage 32 is driven like this, the head 31a is moved to the intended track TA (or point A in FIG. 4) at a speed corresponding to the intended velocity signal VA.

When appropriate intended velocity data, which correspond to the moving distance of the head 31a, are stored in the velocity register 42, as described above, the head 31a is moved to the intended track TA at the appropriate velocity. In the case, therefore, where the head 31a seeks the relatively short distance, starting from point B and ending at point A in FIG. 4, the intended velocity (or curve 50) is set a little lower than the intended velocity in the case of seeking the long distance, starting from point D and ending at point A. This intended velocity (or curve 50) is set as a speed which can prevent the speed of the head 31a from becoming excessively large upon shifting velocity control to position control (or transient control) at the time when the head 31a is just before the intended track, and which can keep the smallest amount of increase the invention has been described with respect to a specific embodiment, it is not intended that it be limited to that embodiment. Other embodiments should occur to those of ordinary skill in the art having the benefit of the teachings in this patent.

What is claimed is:

1. A magnetic head controlling apparatus comprising:
   a position signal generator means for generating a position signal on the basis of servo-data previously recorded on a magnetic disk, said position signal representing the position of the magnetic head on the magnetic disk;
   a track detector means for generating a track pulse every time the magnetic head crosses a data track on the magnetic disk, on the basis of the position signal applied for the position signal generator means;
   an intended address memory means for storing an intended track address on the magnetic disk which represents the intended moving position of the magnetic head;
   an intended velocity memory means for storing first and second tables beforehand, said first table containing intended velocity data suitable for use when the moving distance of said magnetic head is comparatively short, said second table containing intended velocity data suitable for use when that moving distance is comparatively long;
   an intended velocity data determining means for counting the number of track pulses generated from said track detector means, for calculating a moving distance by which said magnetic head must be moved to the intended track address, based on the difference between the intended track address and the number of track pulses counted, and for accessing said intended velocity memory means with an address corresponding to the moving distance calculated, thereby selecting intended velocity data most apporpriate for said magnetic head from one of said first and second tables; and a magnetic head moving menas for moving the magnetic head at an appropriate velocity on the basis of the intended velocity data determined by the intended velocity data determining means.

* * * * *